Patented Mar. 16, 1943

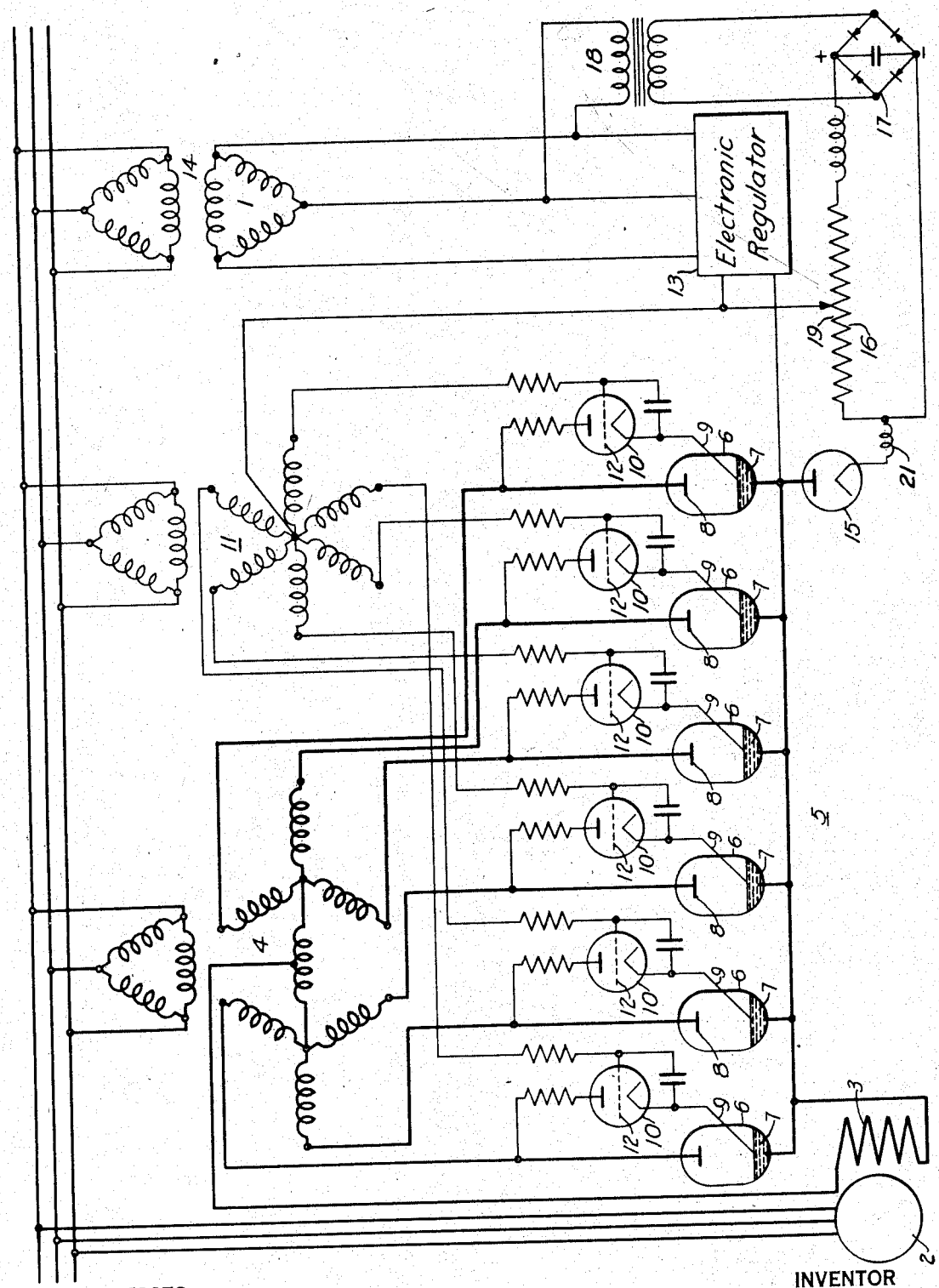

2,313,957

UNITED STATES PATENT OFFICE.

2,313,957

VAPOR ELECTRIC DEVICE

Henry C. Meyers, Irwin, Pa., assignor to Westinghouse Electric & Manufacturing Company, East Pittsburgh, Pa., a corporation of Pennsylvania Application August 2, 1940, Serial No. 349,781

7 Claims. (Cl. 171—119)

My invention relates to a vapor electric device, and particularly to a control system for regulating the output of a vapor electric converter.

In the operation of dynamo-electric machines such a generators or rotary condensers, it is frequently desirable to provide a rapidly variable field for the dynamo-electric machine in order to control characteristics of the machine or the line to which it is connected.

In the construction according to my invention, I have provided a vapor electric device preferably of the make-alive type for providing excitation to the field of a dynamo-electric machine from any suitable alternating current source.

In the construction according to my invention, the valves of the converter are controlled by a suitable grid controlling device which is biased by an electronic regulator connected to and operating in response to the alternating current circuit to which the dynamo-electric machine is connected.

It is usual to provide regulators having a wide variation of biasing potential in order to secure a rapid variation in the current supplied to the field winding.

I have found it desirable to operate the converter at a relatively low percentage of its possible output for normal operation or field requirements so that when it is necessary to rapidly increase the field strength, additional power is available by advancing the commutation angle in the valves of the converter. Considerable difficulty has heretofore been experienced because at the instant when the regulator is decreasing the power to the field winding, the biasing potential will be sufficiently negative to block the operation of the valves of the converter so that for extreme negative biasing potential only one of the valves will be operative and the remaining valves will be blocked.

In such circumstances the stored energy of the field will require a material interval to be returned or dissipated so that the response of the dynamo-electric machine is not as fast as is desirable. To eliminate this difficulty, I have provided means for so limiting the negative bias that at all times the valves will remain operative even though they are fired very late in the conducting half cycle.

When all of the valves are made successively conducting very late in the conducting half cycle, it is found that a result very similar in effect to inversion takes place and that the stored energy of the field is rapidly returned to the supply source, thus permitting much more rapid operation of the dynamo-electric machine than has heretofore been possible.

I have provided a relay in the form of a vapor electric valve connected across the output terminals of the regulator and so adjusted that at a predetermined negative voltage the valve breaks down and carries sufficient current that the output potential of the regulator is limited to a potential insufficient to totally block the operation of the main vapor electric valves.

It is, accordingly, an object of my invention to provide a regulating system having a high speed response.

It is a further object of my invention to provide a regulating system with means for limiting the negative potential to a potential short of the blocking potential.

It is a further object of my invention to provide a valve type relay for governing the output potential of an electronic regulator.

Other objects and advantages of my invention will be apparent from the following detailed description taken in conjunction with the accompanying drawing, in which the figure is a schematic illustration of a regulating system according to my invention.

In the exemplary embodiment of my invention, the alternating current circuit 1 is stabilized by means of a dynamo-electric machine 2, preferably of the type known as a synchronous condenser. The field winding 3 of the dynamo-electric machine 2 is excited by energy supplied from any convenient alternating current source, such as a transformer 4 connected to the alternating current circuit 1, the energy flow from the source 4 to the field winding 3 being controlled by a vapor electric converter 5 herein illustrated as of the make-alive type. Each valve 6 of the converter 5 comprises a vaporizable cathode 7, a cooperating anode 8 and a make-alive electrode 9, such as described in Patent 2,069,283, for initiating a cathode spot on the cathode 7.

The make-alive electrode 9 is supplied with energy from any suitable source herein illustrated as so-called anode firing, that is, make-alive power is secured from the anode 8 of the tube 6 being controlled. Obviously any suitable source of make-alive power, such as an auxiliary transformer or generator, can be used.

The application of the make-alive potential is controlled by means of a grid controlled firing tube 10. A suitable grid transformer 11 is provided for supplying grid potential to the grids 12 of the firing tubes 10. Preferably, the grid transformer 11 is shifted in phase or arranged in phase relation to the main transformer 4 so that at normal operation the grid devices 10 will be energized fairly late in the conducting half cycle to provide normal energy flow to the exciting winding 3 of the dynamo-electric machine 2.

An electronic regulator 13 of a well known type is connected by means of a suitable transformer 14 to the alternating current circuit 1 and provides a biasing potential variable in response to variations of the operating conditioning in the alternating current circuit 1. If the potential of the alternating current circuit 1 should decrease, the regulator 13 will produce a positive biasing potential so that the grid transformer 11 will energize the grid devices 10 earlier in the conducting half cycle and increase the energy delivered to the field winding 3, and consequently the regulating effect of the dynamo-electric machine 2.

On the other hand, if the potential of the alternating current circuit 1 should increase, the electronic regulator 13 will supply a negative bias to cause the firing tubes 10 to operate later in the cycle and thus decrease the energy supplied to the field winding 3.

In the event of rapid changes in the alternating current circuit conditions, the electronic regulator 13 may overshoot so that if the voltage should suddenly rise such as by drop of a large portion of its load, the electronic regulator 13 would produce sufficient negative bias to completely block all of the firing tubes 10. However, blocking all of the firing tubes 10 causes all of the valves 6 to cease to carry a current, except the one that is carrying the current at the instant of blocking.

The stored energy of the field 3 is, therefore, dissipated relatively slowly and the regulating effects of the dynamo-electric machine 2 is not sufficiently manifest in a short interval of time. To prevent blocking of the grid devices 10, I provide a relay in the form of a vapor electric valve 15, preferably of the two-element type connected across the output terminals of the electronic regulator 13. Then in the event the electronic regulator 13 produces a negative bias greater than the breakdown potential of the vapor electric valve 15, the valve 15 will break down and carry a current which substantially short circuits the regulator to maintain the negative bias at a suitable potential so that the grid devices 10 are not completely blocked and the vapor electric valves 6 are periodically energized so that they carry current, and the energy of the field winding 3 is fed back to the alternating current source 4 in a manner substantially similar to inverted operation of vapor electric devices. If desired a reactor 21 may be placed in series with the valve 15 to improve the feed back in the event of suddenly applied negativ bias.

The breakdown characteristic of the relay tube 15 can be determined by means of a suitable potential inserted between the tube 15 and the terminals of the electronic regulator 13. I prefer to provide this potential by means of a suitable potentiometer 16 energized from any direct current source, such as the bridge type rectifier 17 supplied from a transformer 18 connected to the alternating current circuit. Obviously, the breakdown characteristic of the tube 15 may be varied at will by varying the connection 19 to the biasing potentiometer 16.

While for purposes of illustration I have shown and described a specific embodiment of my invention, it will be apparent that changes and modifications can be made therein without departing from the true spirit of my invention or the scope of the appended claims.

I claim as my invention:

1. A voltage regulating system comprising an alternating current circuit, a dynamo-electric machine connected to said circuit, a field winding for said machine, a source of alternating current potential, a plurality of vapor electric valves for supplying energy from said source to said field winding, grid means for controlling said valves, a source of grid potential, a regulator responsive to the voltage of said alternating current circuit for impressing biasing potential on said source of grid potential, said regulator being capable of supplying sufficient negative potential to said source of grid potential to block operation of said grid means, and means for reducing the negative potential output of said regulator sufficiently to prevent complete blocking of said grid means.

2. A regulating system comprising, in combination, a plurality of main valves of the make-alive type, auxiliary valve-means for controlling the make-alive circuits of the main valves, alternating-current energizing-means for said auxiliary valve-means, a source of variable biasing-voltage in series-circuit relation to said alternating-current energizing-means, said biasing-voltage source being subject, at times, to operating-conditions whereby it would develop a biasing-voltage which is sufficiently negative to substantially completely block all of the main valves, and voltage-responsive voltage-limiting means connected in shunt-circuit relation to the biasing-voltage source for selectively drawing a large current only when the biasing voltage approaches a negative value which would completely block all of the main valves.

3. A regulating system comprising, in combination, a plurality of main valves of the make-alive type, auxiliary valve-means for controlling the make-alive circuits of the main valves, alternating-current energizing-means for said auxiliary valve-means, a source of variable biasing-voltage in series-circuit relation to said alternating-current energizing-means, said biasing-voltage source being subject, at times, to operating-conditions whereby it would develop a biasing-voltage which is sufficiently negative to substantially completely block all of the main valves, and a non-linear impedance device operatively associated with said biasing-voltage source in such manner as to substantially alter the voltage-ratio of its output-voltage only when the biasing voltage approaches a negative value which would completely block all of the main valves, whereby a complete blocking of all of the main valves is prevented.

4. A regulating system comprising, in combination, an alternating-current synchronous dynamo-electric machine having alternating-current main-circuit terminals, and direct-current exciting-circuit terminals, an alternating-current line connected to the alternating-current terminals, a source of exciting energy including a plurality of main valves energized from the alternating-current line, said main valves being of the make-alive type, auxiliary valve-means for controlling the make-alive circuits of the main valves, alternating-current energizing-means for said auxiliary valve-means, means predeterminedly responsive to the voltage of the alternating-current line for automatically developing a source of variable biasing-voltage in series-circuit relation to said alternating-current energizing-means, said biasing-voltage source being subject, at times, to operating-conditions whereby it would develop a biasing-voltage which is sufficiently negative to substantially completely block all of the main valves, and voltage-responsive voltage-limiting means connected in shunt-circuit relation to the biasing-voltage source for selectively drawing a large current only when the biasing voltage approaches a negative value which would completely block all of the main valves.

5. A regulating system comprising, in combination, an alternating-current synchronous dynamo-electric machine having alternating-current main-circuit terminals, and direct-current exciting-circuit terminals, an alternating-current line connected to the alternating-current terminals, a source of exciting energy including a plurality of main valves energized from the alternating-current line, said main valves being of the make-alive type, auxiliary valve-means for controlling the make-alive circuits of the main valves, alternating-current energizing-means for said auxiliary valve-means, means predeterminedly responsive to the voltage of the alternating-current line for automatically developing a source of variable biasing-voltage in series-circuit relation to said alternating-current energizing-means, said biasing-voltage source being subject, at times, to operating-conditions whereby it would develop a biasing-voltage which is sufficiently negative to substantially completely block all of the main valves, and a non-linear impedance device operatively associated with said biasing-voltage source in such manner as to substantially alter the voltage-ratio of its output-voltage only when the biasing voltage approaches a negative value which would completely block all of the main valves, whereby a complete blocking of all of the main valves is prevented.

6. A regulating system for controlling the operating characteristics of a make-alive type converter comprising a plurality of make-alive type valves, an auxiliary grid controlled valve for each make-alive valve for controlling the operation of the make-alive valves, a source of grid potential for said grid controlled valves, a source of variable biasing potential, means for impressing said variable biasing potential on said grid potential, said variable biasing potential being capable of completely blocking operation of said make-alive valves and means for limiting said biasing potential to a value insufficient to completely block said make-alive valves.

7. A regulating system comprising, in combination, a supply circuit, a load circuit, a main valve of the make-alive type connected between said circuits, auxiliary valve-means for controlling the make-alive circuit of said main valve, a source of alternating control-potential for said auxiliary valve-means, a source of variable biasing-potential in series-circuit relation to said source of alternating control-potential, said source of variable biasing-potential being subject, at times, to operating-conditions whereby it would develop a biasing-potential which is sufficiently negative to substantially completely block said main valve and voltage-responsive voltage-limiting means connected in shunt-circuit relation to the biasing-potential source for selectively drawing a large current only when the biasing potential approaches a negative value which would completely block said main valve.

HENRY C. MYERS.